United States Patent [19]

Kay

[11] Patent Number: 5,416,584
[45] Date of Patent: May 16, 1995

[54] SINUSOIDAL NOISE INJECTION INTO THE DITHER OF A RING LASER GYROSCOPE

[75] Inventor: Robert M. Kay, Seminole, Fla.

[73] Assignee: Honeywell Inc., Minneapolis, Minn.

[21] Appl. No.: 233,162

[22] Filed: Apr. 25, 1994

[51] Int. Cl.⁶ .............................................. G01C 19/70
[52] U.S. Cl. .................................................... 356/350
[58] Field of Search ........................................ 356/350

[56] References Cited

U.S. PATENT DOCUMENTS

| Re. 34,121 | 11/1992 | Benoist | 356/350 |
|---|---|---|---|
| 3,467,472 | 9/1969 | Killpatrick | 356/350 |
| 4,445,779 | 5/1984 | Johnson | 356/350 |
| 4,529,311 | 7/1985 | Morgan et al. | 356/350 |
| 4,653,920 | 3/1987 | Geen | 356/350 |
| 4,657,392 | 4/1987 | Egli | 356/350 |
| 4,686,863 | 8/1987 | Martin | 356/350 X |
| 4,695,160 | 1/1987 | Egli | 356/350 |
| 4,740,084 | 4/1988 | Curby et al. | 356/350 |
| 4,981,359 | 1/1991 | Tazartes et al. | 356/350 |
| 4,987,334 | 1/1991 | Jungwirth | 356/350 X |
| 5,088,825 | 2/1992 | Derry et al. | 356/350 |

Primary Examiner—Vincent P. McGraw
Attorney, Agent, or Firm—Robert B. Leonard; Craig J. Lervick

[57] ABSTRACT

Method and apparatus for reducing the effects of lock-in in a ring laser gyroscope. A sinusoidal noise signal is generated having a peak amplitude which shifts as a function of a dither drive monitor signal to new, random, peak amplitude levels. In the preferred embodiment, the peak amplitude level changes at each zero crossing of the dither drive monitor signal. Each new peak amplitude level is determined as a function of a value provided by a passband filtered random or pseudo random noise source. A step noise signal representative of that passband filtered value is multiplied by the dither drive monitor signal and the resulting sinusoidal noise signal is summed into the dither drive monitor signal. The resulting signal is then used to introduce a frequency bias, electrically or mechanically in at least one of the RLG light beams.

17 Claims, 5 Drawing Sheets

SINUSOIDAL NOISE INJECTION INTO THE DITHER OF A RING LASER GYROSCOPE

FIELD OF THE INVENTION

The present invention pertains generally to the field of gyroscopic instruments, and more particularly to a method of preventing dynamic lock-in in a ring laser gyroscope by injecting sinusoidally shaped noise into the gyroscope's dither drive.

BACKGROUND OF THE INVENTION

In a simple ring laser gyroscope (gyro or RLG) two beams of substantially monochromatic light travel in opposite directions in a closed optical path. Rotation within the plane of the closed optical path causes the effective path length traveled by one beam to increase while the path length traveled by the other beam decreases. Since the frequency of oscillation of the beams of light used in the gyroscope depends upon the effective length of the closed optical path, the changes in optical path length produce an increased frequency in one of the beams and a decreased frequency in the other. The amount of frequency change is indicative Of the rotation rate of the closed optical path relative to a plane in which rotation is to be sensed. It can be calculated by means of the interference pattern created by interaction of the two light beams.

As the rotation rate relative to the closed optical path approaches zero, however, the difference in frequency between the two beams becomes small, and the two beams tend to resonate together or "lock-in" so that the two beams oscillate at only one frequency. The rotation rate below which lock-in occurs is commonly referred to as the "lock-in rate." When the gyroscope is rotating at rotation rates below the lock-in rate and the beams are locked in, it becomes impossible to accurately measure rotation. This inability to accurately measure low rotation rates reduces the effectiveness of a ring laser gyroscope in navigational systems. Thus, much developmental work has been conducted in the field of ring laser gyroscopes for the purpose of reducing or eliminating the effects of lock-in.

It is well known in the art, for instance, to reduce the effects of lock-in by introducing dither. A sinusoidal frequency bias can be mechanically or electro-optically introduced in at least one of the two oppositely travelling beams of light. To be effective, the frequency bias introduced must be greater than the frequency difference which occurs just prior to lock-in for a majority of time. In such systems, the sign or polarity of the frequency bias introduced is periodically reversed so that after one complete cycle of the periodically reversing bias, the time integrated frequency difference between the two beams of light is substantially zero.

The sinusoidal frequency biasing approach reduces but does not eliminate lock-in error. For instance, each time the polarity of the frequency bias reverses, the frequency bias becomes zero and the two light beams can lock-in. This type of lock-in is termed "dynamic lock-in." Although the time intervals in which the beams could dynamically lock-in are very short and, consequently, any possibly resulting gyroscopic error is greatly reduced, nevertheless the resulting error accumulates in the gyroscopic output angle signal. In time the error can amount to a bothersome level, particularly in precision navigational systems.

An improved biasing system was disclosed in U.S. Pat. No. 3,467,472 issued to Joseph E. Killpatrick, and assigned to the present assignee. U.S. Pat. No. 3,467,472 discloses a method of reducing cumulative error due to dynamic lock-in. In this method, a randomizing bias is added to the frequency bias. The randomizing bias causes the times at which the overall dithering signal reverses to shift randomly. This randomization results in a reduced average cumulative error. The discussion in U.S. Pat. No. 3,467,472 of ring laser gyroscopes, the lock-in problem and possible solutions is hereby incorporated by reference.

Typically, the randomization signal is noise that has been passed through a low pass filter. The resulting low pass filtered noise is summed with the normal dither sinusoidal signal and injected into the dither drive mechanism. Turnaround angles are randomized, but, since much of the injected electrical noise power is not effective in changing the turnaround angle, this process is not near optimum in terms of efficiency.

A second approach to an improved biasing system was disclosed in U.S. Pat. No. 4,695,160, issued to Werner H. Egli, and also assigned to the present assignee. U.S. Pat. No. 4,695,160 teaches that the zero rate crossings in each dither cycle constitute a source of dynamic, lock-in error and that the error is cumulative. That cumulative error can, however, be substantially reduced by altering the instantaneous phase difference between the two counter-travelling beams of light at successive zero rate crossings by a predetermined value. The discussion in U.S. Pat. No. 4,695,160 of ring laser gyroscopes, the lock-in problem and possible solutions is hereby incorporated by reference.

Egli teaches that the instantaneous phase difference can be manipulated by altering the maximum positive and negative dither angle amplitudes by a preselected amount and in phase with the zero rate crossings. He suggests summing two in phase sinusoids (one at the dither frequency and the second at an integer fraction of the dither frequency) in order to create a composite sinusoidal dither signal in which the maximum positive and negative amplitudes are periodically altered. This causes a corresponding change in the maximum positive and negative dither angles of the gyro. As long as the change is greater than half of an interference fringe spacing (or "count"), the incremental lock-in error for two successive dither cycles will be approximately zero. To ensure this, Egli, in one embodiment, suggests setting the amplitude of the second sinusoidal signal to a level necessary to cause a maximum dither angle amplitude of $\sqrt{2}/2$ when operating independently of the first sinusoidal signal. In addition, Egli suggests that further benefits can be achieved by modifying the first sinusoidal signal to have a maximum amplitude which changes to a new, random level every other dither cycle.

The approach taught by Egli requires the generation of two in-phase sinusoidal components, one at an integer fraction of the frequency of the other. It requires photodetectors to measure the phase angle between the two light beams in order to detect the zero rate crossing and significant processing power in order to adjust the dither based on the phase angle measurements.

It is apparent that there is a need for an improved method of reducing lock-in error in a ring laser gyro. The addition of noise to the dither of a ring laser gyro has proven effective at reducing such error. What is needed, however, is a method of optimally injecting noise to a dither drive signal in order to randomize the cycle to cycle turnaround angles in a way which most efficiently produces angular changes between cycles. It is preferable that such a method minimize power dissipation while, at the same time, lowering the high frequency current required from the RLG power supply.

SUMMARY OF THE INVENTION

To overcome limitations in the art described above and to overcome other limitations that will become apparent upon reading and understanding the present specification, the present invention provides a method of reducing lock-in in a ring laser gyroscope. A sinusoidal noise signal is generated having a peak amplitude which shifts as a function of a dither drive monitor signal to new, random, peak amplitude levels. In the preferred embodiment, the peak amplitude level changes at each zero crossing of the dither drive monitor signal. Each new peak amplitude level is determined as a function of a value provided by a passband filtered random or pseudo random noise source. A step noise signal representative of that passband filtered value is multiplied by the dither drive monitor signal and the resulting sinusoidal noise signal is summed into the dither drive monitor signal. The resulting signal is then used to introduce a frequency bias, electrically or mechanically, in at least one of the RLG light beams.

In another aspect of the present invention, a ring laser gyroscope is described which includes randomization dithering means for injecting sinusoidally shaped noise into the dither mechanism of a mechanically or electrooptically dithered ring laser gyroscope. The gyro comprises support means for supporting two counter-traveling beams of substantially monochromatic light substantially travelling in opposite directions in a closed loop path, biasing means for causing a frequency bias in a selected one of the light beams and bias control means, connected to the biasing means, for controlling dither by the dithering means.

According to that aspect of the present invention, the biasing means comprise dithering means for dithering the selected light beam in order to induce normal frequency bias and randomization frequency bias in the selected light beam. The bias control means comprise dither amplitude sensor means for obtaining a sinusoidally shaped dither rate monitor signal, combining means for generating a composite dither signal from a normal dither and a randomization dither, dither amplitude control means for controlling the normal dither and randomization dither generator means for generating the randomization dither as a function of the dither rate monitor signal. Finally, the randomization dither generator means comprise an approximately random noise source having a noise output signal, step noise generating means, connected to the approximately random noise source, for generating a step noise signal and multiplier means for multiplying the sinusoidally shaped dither rate monitor signal by the step noise signal in order to generate the randomization dither.

In yet another aspect of the present invention, a dither drive system is described which can be used to inject sinusoidal noise into the dither mechanism of a mechanically dithered ring laser gyroscope. The system comprises an approximately random noise source having a noise output signal, dither monitoring means for obtaining a sinusoidally shaped dither rate monitor signal, step noise generating means for generating a step noise signal, wherein the step noise generating means comprise sampling means for sampling the noise output signal at designated points of the dither rate monitor signal, multiplier means for multiplying the sinusoidally shaped dither rate monitor signal by the step noise signal in order to obtain a sinusoidal noise signal, scaling means for scaling the sinusoidally shaped dither rate monitor signal and summing means for summing the scaled sinusoidally shaped dither rate monitor signal with the sinusoidal noise signal.

DESCRIPTION OF THE DRAWINGS

In the drawings, where like numerals refer to like elements throughout the several views.

DETAILED DESCRIPTION OF THE DRAWINGS

In the following detailed description of the Drawings, reference is made to the accompanying drawings which form a part hereof, and in which is shown by way of illustration a specific embodiment in which the invention may be practiced. It is to be understood that other embodiments may be utilized and structural or logical changes may be made without departing from the scope of the present invention. In particular, although the invention is described in terms of a mechanically dithered gyro, it should be apparent that the method of dithering taught can be applied to a gyro which is electrically or optically dithered. The following detailed description, therefore, is not to be taken in a limiting sense, and the scope of the present invention is defined by the appended claims.

Figure 1:
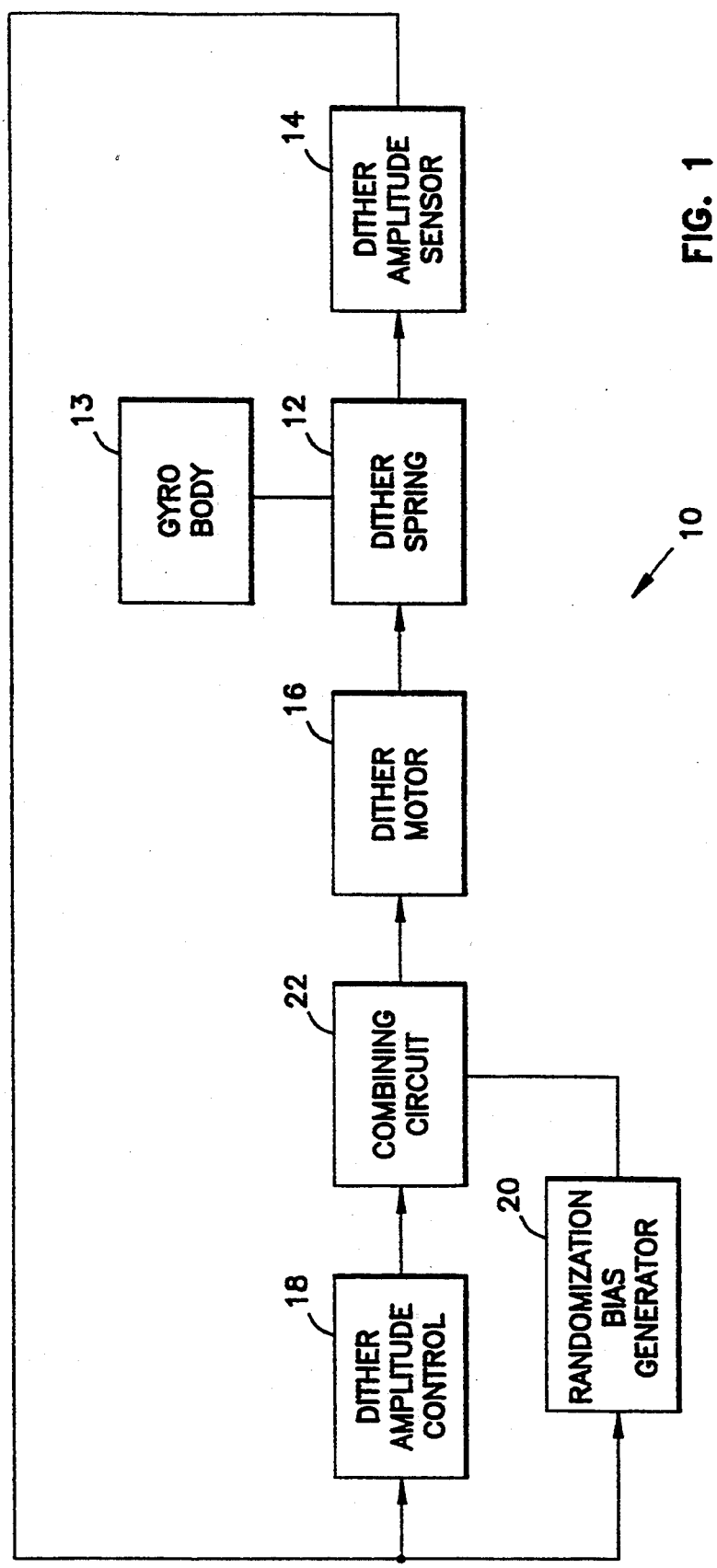
FIG. 1 is a system block diagram of a mechanically dithered ring laser gyroscope according to the present invention.

The dithering mechanism of a mechanically dithered ring laser gyroscope comprises a spring function for maintaining a certain dither frequency of oscillation and an excitation circuit for injecting energy into the dither spring. A system block diagram of a ring laser gyroscope dithering mechanism 10 corresponding to the above model is shown generally in FIG. 1. In FIG. 1, dithering mechanism 10 comprises a mechanical dither spring 12, a dither amplitude sensor 14, a dither motor 16, dither amplitude control 18, a randomization dither generator 20 and a combining circuit 22. Mechanical dither spring 12 is connected to dither amplitude sensor 14 and dither motor 16; spring 12 controls dither movement of gyro body 13. Dither amplitude sensor 14 is connected to dither amplitude control 18 and randomization dither generator 20, which are in turn connected through combining circuit 22 to dither motor 16. Dither motor 16 and amplitude sensor 14 comprise piezo-electric transducers (PZTs) which are configured to inject energy into dither spring 12 and to measure the resulting oscillation, respectively. In the typical embodiment, four to twelve PZTs are mounted to spokes of dither spring 12. One of the PZTs forms part of dither amplitude sensor 14; the others are used in dither motor 16.

Dither spring 12, dither amplitude sensor 14, dither motor 16 and dither amplitude control 18 form a single closed loop oscillator. The two requirements of any oscillator are unity gain and zero phase shift around the closed loop. In one embodiment of dithering mechanism 10, unity gain is achieved with an amplitude control loop. In all embodiments, phase shifts are tightly controlled by design over a broad frequency range so that zero phase shift occurs only at the resonant frequency. These constraints ensure that all loop waveforms resemble good quality sinusoids.

In the preferred embodiment, dither amplitude control 18 generates a controlled electrical dither driving signal which maintains the measured dither amplitude at the desired level. Randomization dither generator 20 generates the randomization dither injected into dither spring 12.

It is desireable to make the most efficient use of the energy added to randomize turnarounds. The waveforms of a conventional (no noise) steady rate dither drive signal and of the gyroscope's corresponding dither angle are nominally sinusoidal. At resonance, the dither angle, $\theta$, lags the drive voltage, $V_D$, by approximately 90 degrees, and the dither angular rate is in phase with $V_D$. Therefore, to inject noise in a manner that maximizes the change in $\theta$ between turnarounds, a sinusoidal noise waveform is applied that is in phase with the normal $V_D$.

One method of generating sinusoidal noise is based on a clock driven shift register configured to supply a pseudo-random binary sequence. The resulting random binary sequence is bandpass filtered in the 10 to 20 kilohertz range. The resulting random noise signal, $V_n$, has many noise characteristics, including a gaussian amplitude distribution. Its spectral density is concentrated in a frequency range much higher than the dither frequency to minimize correlation over one dither period.

In the above method, a sample/hold (SH) circuit samples $V_n$ at both the positive and negative zero crossings of the dither rate monitor signal, $V_s$, in order to generate step noise, $V_{ns}$. Step noise has constant amplitude between these zero crossings, but the amplitude changes randomly at the zero crossings.

The dither rate monitor signal, $V_s$, tracks the RLG dither rate in both amplitude and phase. Multiplying $V_s$ by the step noise, $V_{ns}$, results in a sequence of half sinusoids which vary randomly in amplitude from dither half period to half period.

$V_s$ is also used, after a scaling change, as the steady state drive to the dither motor. Therefore, the sinusoidal noise and the steady state drive are in phase.

Two variations on the just defined sinusoidal noise concept are described here. These variations illustrate the flexibility available in modifying the sinusoidal noise waveform.

(1) Full Cycle Noise

The described sinusoidal noise function changes amplitude randomly every half dither period. A simple change of halving the SH sample rate results in sinusoidal noise whose amplitude changes randomly every full dither period.

(2) Subtractive Noise

By adding a second SH circuit and connecting its input to the output of the first SH, an exact replica of the first output is generated, but delayed by one-half dither period. We define the two SH outputs as $V_{ns1}$ and $V_{ns2}$ and combine them such:

$$V_{ns} = V_{ns1} - V_{ns2}$$

This new $V_{ns}$ is used to generate the sinusoidal noise. Therefore, noise that is injected during one-half dither period is removed in the subsequent half period. The sustained oscillation following a single half sine is thereby removed.

Of course, a third variation is possible by combining the first two in a full cycle subtractive technique.

The ease of modifying the sinusoidal noise amplitude suggests other possibilities. One example is a reduction in the RLG random walk error via a closed loop control on the noise amplitude.

Figure 2:
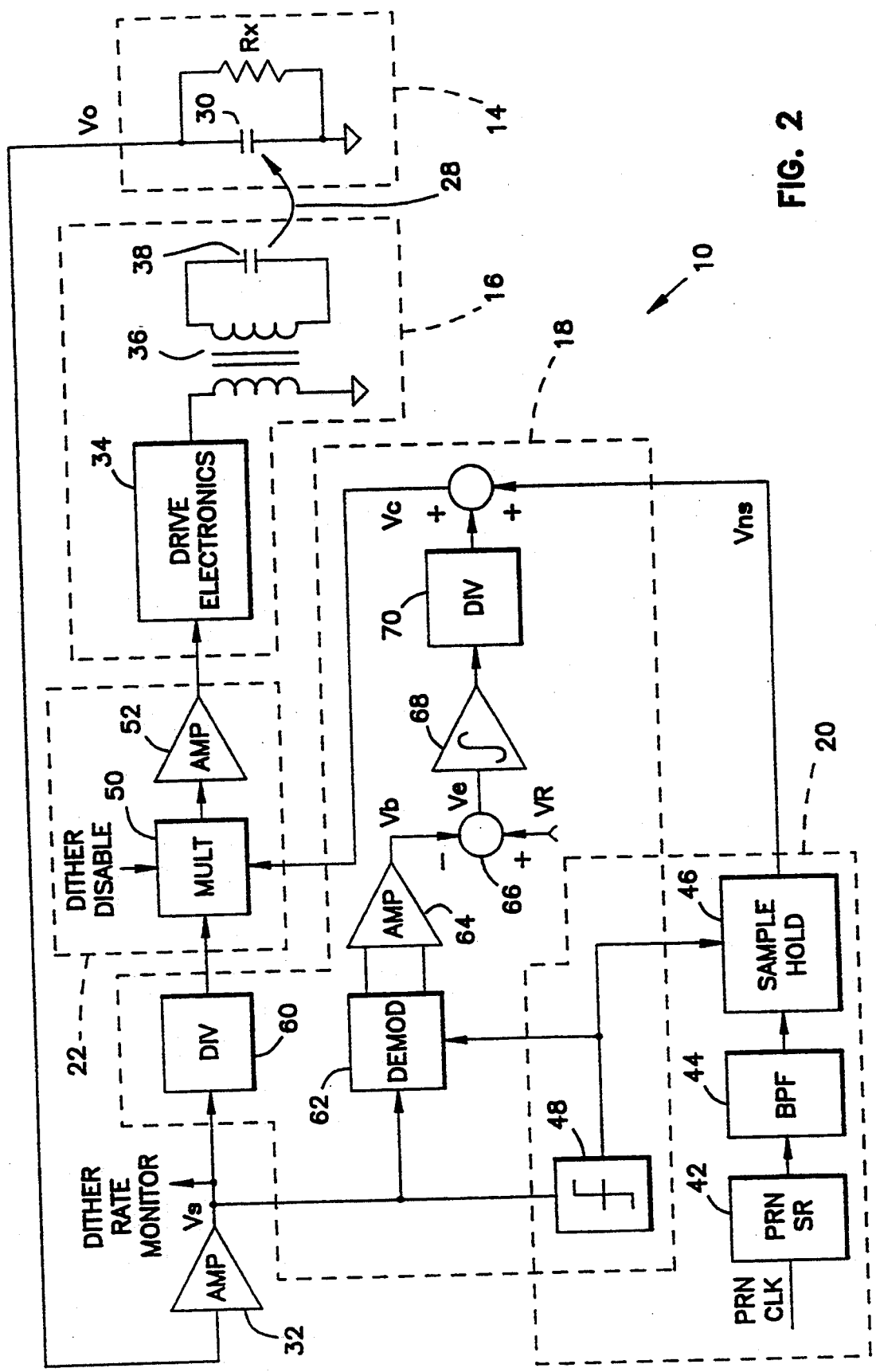
FIG. 2 is a more detailed block diagram of the dither electronics of FIG. 1.

A more detailed block diagram of the dither electronics of one embodiment of dithering mechanism 10 is shown in FIG. 2. The oscillator closed loop path is evident; it consists of amplifier 32, dither amplitude control 18, combining circuit 22, dither motor 16, dither spring 12 and dither amplitude sensor 14. In FIG. 2, dither spring 12 is represented by a transfer function 28 corresponding to mechanical spring/mass resonant coupling between dither motor 16 and dither amplitude sensor 14o Transfer function 28 corresponds to the dither angular response to the drive voltage $V_d$ supplied by dither motor 16. That response can be modeled fairly accurately as a classic second order response equation:

$$\frac{\theta(s)}{KV_D(s)} = \frac{\omega_n^2}{s^2 + s\omega_n/Q + \omega_n^2}$$

where
$\theta$ = dither angle
$V_D$ = drive voltage
K = RLG electro-mechanical constant
$\omega_n$ = spring-mass natural frequency
Q = spring-mass resonant gain At very low frequency, $$\frac{\theta(s)}{KV_D(s)} = 1$$

and at resonance ($\omega = \omega_n$):

$$\frac{\theta(s)}{KV_D(s)} = Q$$

In the preferred embodiment, the spring-mass resonant Q of spring 12 is deliberately set very large (typically from 70 to 200) to minimize the driving voltage required.

In operation, the phase relationship between the drive voltage at dither motor 16 and the dither angle at dither amplitude sensor 14 changes extremely rapidly from 0° to −180° as the frequency is increased in the vicinity of resonance. At resonance, drive voltage leads dither angle by 90°. This is the expected response for a second order under-damped network. At the same time, the dither sensor output leads the dither angle by 90° over the frequency range of interest. These response characteristics mean that the overall phase from drive voltage through sensor 14 output voltage is zero only at resonance. By constraining other loop phase shifts to be near zero, the oscillator loop must operate at a frequency equal to the resonant frequency. This relationship holds true for all dither frequencies, provided that the electronics phase shifts are adequately small.

In the embodiment shown in FIG. 2, dither amplitude sensor 14 is formed by placing a PZT 30 attached to one of the dither spokes of dither spring 12 in parallel with a scaling resistor Rx. Scaling resistor Rx is a relatively low impedance resistor selected during manufacturing of the ring laser gyro to normalize the sensor scale factor. Since a PZT sensor can be modeled quite accurately as a voltage source in series with a capacitor (with the voltage source having a voltage which is directly proportional to the dither angle), the addition of the low impedance resistor Rx in parallel with PZT 30 forms a differentiator on the voltage source, producing a near 90° phase lead. The output voltage $V_o$ of dither amplitude sensor 14 therefore becomes proportional to the dither rate. $V_o$ is amplified by amplifier 32 to form $V_s$ before being sent to dither amplitude control 18 and dither generator 20.

In one embodiment, Rx is chosen so that $V_o$ is 1V peak at the desired dither amplitude. This limits $V_o$ to about 1V peak, ensuring that sustained oscillations of $V_o$ following power turnoff will not damage the electronics.

Rx also serves to introduce an effective pole into the sensor transfer function $\theta = \theta_x = 1/Rx*Cx$ (where Cx is the series capacitor in the PZT model discussed above). The pole helps to attenuate the dither motor/sensor high frequency spurious responses. The pole does introduce phase shift at the dither frequency but, in general, this phase shift is less than 10 degrees.

Figure 3:
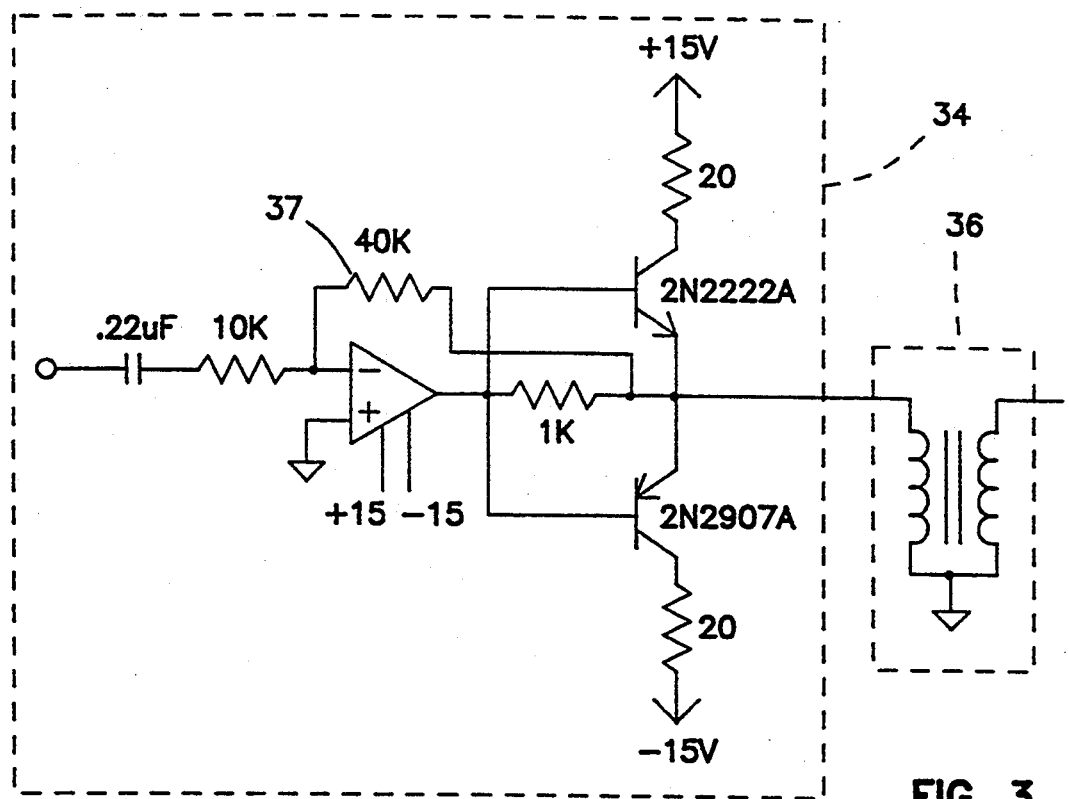
FIG. 3 is an electrical block diagram of drive electronics which could be used in the dither electronics of FIG. 2.

In the embodiment shown in FIG. 2, dither motor 16 comprises drive electronics 34, transformer 36 and at least one PZT 38 attached to a spoke of dither spring 12. A representative drive electronics 34 connected to transformer 36 is shown generally in FIG. 3. A low impedance driver (emitter follower) is used to minimize the problems associated with transformer resonances. Op amp feedback resistor 37 (as shown connected to the transistor emitters) eliminates crossover distortion.

Speed in drive electronics 34 is not important; speed limits are set by transformer 36. Typically some gain is required, however, in drive electronics 34 to drive transformer 36. A typical voltage range needed to drive transformer 36 is on the order of ±15 V.

Returning to FIG. 2, in the embodiment of dither amplitude control 18 shown in FIG. 2, a simple resistive divider 60 is used to scale $V_s$ to the input voltage range required at combining circuit 22. At the same time, $V_s$ is demodulated and compared to a DC reference level $V_r$. The resulting two signals are supplied to combining circuit 22 to be used to control the drive amplitude and thereby maintain $V_s$ constant.

In the embodiment shown, beside resistive divider 60, dither amplitude control 18 comprises a demodulator 62, an amplifier 64, a summing circuit 66, an integrating circuit 68 and a division circuit 70. $V_s$ is demodulated by demodulator 62 operating in conjunction with zero crossing detector 48. The result is amplified by amplifier 64, compared to $V_r$, integrated by integrating circuit 68 and scaled by division circuit 70.

Dither amplitude control 18 maintains the dither amplitude constant at some predetermined level. It does this by comparing the average value of the demodulated ac dither rate signal $V_s$ to a voltage reference $V_r$. The difference signal $V_e$ is fed to integrating circuit 68 which integrates and filters $V_e$. Integrating circuit 68 has both a filtering and an integrating function. The filtering function suppresses the even harmonic demodulator products. The integrating function produces a second order loop that ensures accurate steady state tracking between $V_s$ and $V_r$ inasmuch as the error $V_e$ is driven to zero. The attenuated integrator output $V_c$ is a dc voltage that controls the gain of multiplier 50, thereby establishing the oscillator loop gain at unity and maintaining $V_s$ at the proper value.

In the circuit of FIG. 2, randomization dither generator 20 comprises a random noise source 42, a bandpass filter 44, a sample/hold circuit 46 and a zero crossing detector 48. In the embodiment shown, random noise source 42 is a pseudo-random noise shift register driven from an external high frequency clock. The output of the pseudo-random noise shift register is a pseudo-random binary sequence.

Bandpass filter 44 is a filter which passes noise frequencies in the range of 10 to 20 KHz, much higher than the dither frequency, in order to minimize sample-to-sample correlation. Zero crossing detector 48 detects zero crossings in $V_s$. Sample/hold circuit 46 provides a step noise output $V_n$, a sequence of constant levels changing in a random fashion at each zero crossing of $V_s$. Zero crossing detectors 48 are well known in the art and will not be discussed.

Figure 4:
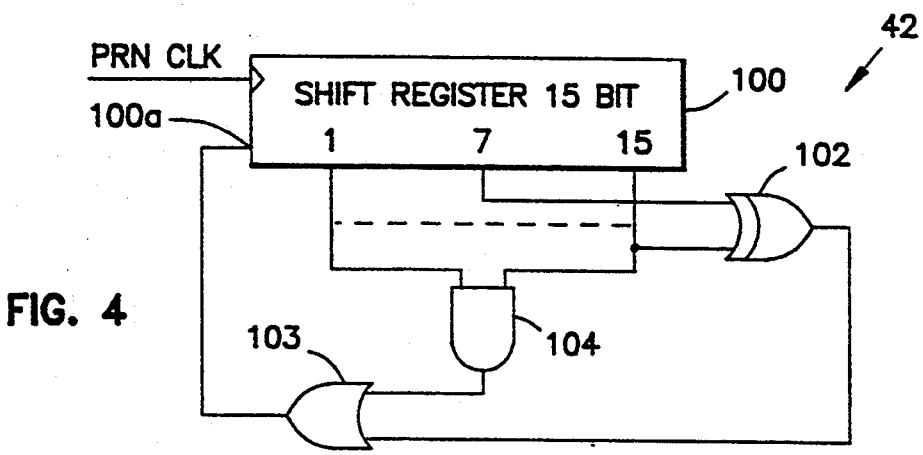
FIG. 4 is a block diagram of a noise source which could be used in the dither electronics of FIG. 2.

The technique of using a maximum length shift register to generate pseudo-random noise is well covered in the literature. For instance, U.S. Pat. No. 4,653,920 issued to Geen, describes the use of such a shift register for generating pseudo-random noise source in the dithering circuit of a ring laser gyro. One embodiment of a pseudo-random noise generator is shown generally in FIG. 4. 15-bit pseudo-random shift register of maximum length ($2^{15}-1$ states). A standard 15 bit shift register 100 is used with feedback from the seventh and fifteenth stages through an exclusive-OR gate 102 and OR gate 103 to the shift register input 100a. As stated previously, the number of possible states is $2^{15}-1$; the forbidden all zeros state is detected through NOR gate 104 and corrected by seeding input 100a with a logic one.

Selection of the PRN CLK frequency is not critical, but it should be significantly higher than the dither frequency. A ratio of at least 100 between the two frequencies is appropriate.

Figure 5:
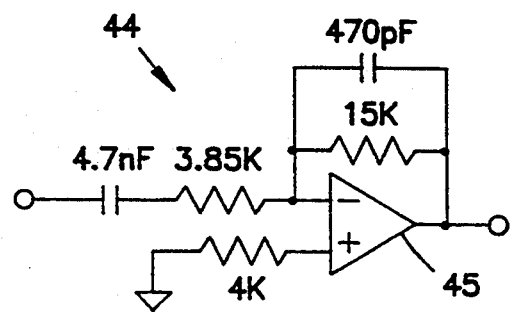
FIG. 5 is an electrical block diagram of an amplifier/filter which could be used in the dither electronics of FIG. 2.

Bandpass filter 44 is shown generally in FIG. 5. Bandpass filter 44 comprises an op amp 45 designed to pass frequencies in the range of 10 to 20 KHz. As such, it is designed to convert the binary pseudo-random portion received from random noise source 42 to an analog signal $V_n$ having the properties of frequency limited noise. It is preferable to set the upper corner frequency of the filter to between 0.05 and 0.1 of the PRN CLK frequency in order to obtain a gaussian distribution. In addition, the center of the pass band should be set at significantly higher than the dither frequency (such as a factor of 5 to 20) in order to minimize correlation between samples (occurring at twice the dither frequency). From these two guidelines, the PRN CLK frequency should be between 50 and 400 times the dither frequency.

Figure 6:
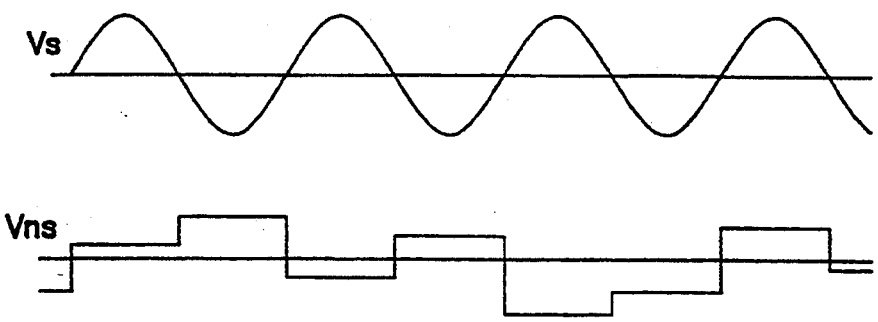
FIG. 6 is a waveform representative of the relationship between the dither rate monitor and step noise signals.
Figure 7:
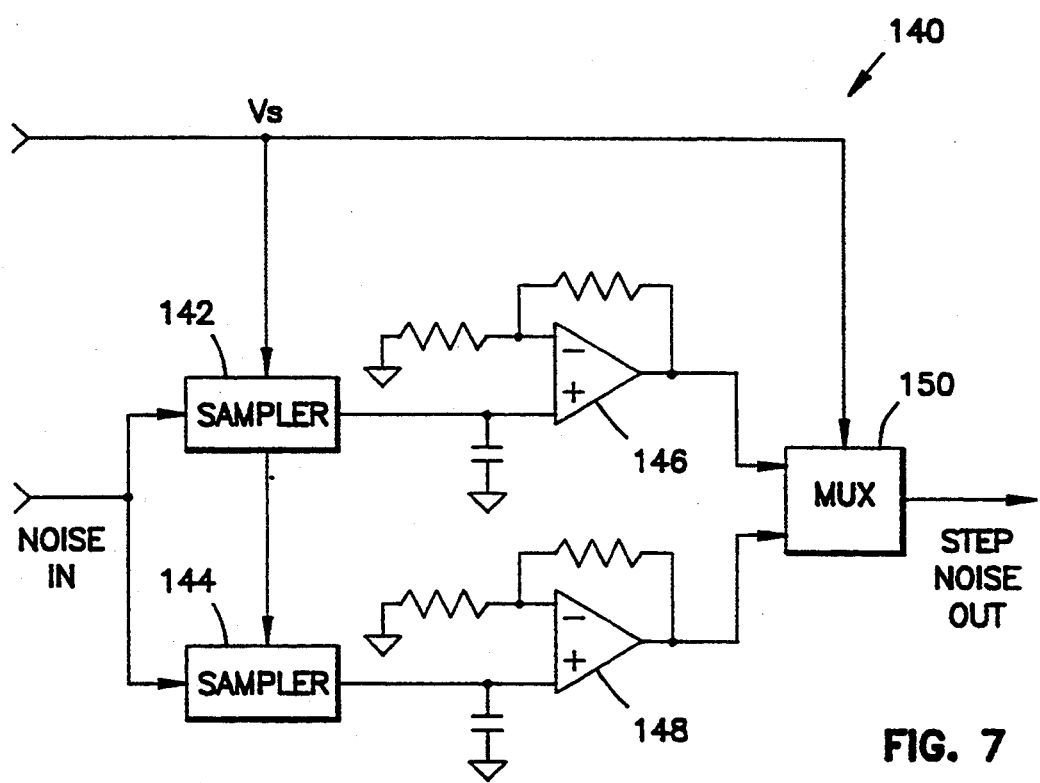
FIG. 7 is a block diagram of a alternate sample and hold circuit which could be used in accordance with the present invention.

In the preferred embodiment, the frequency corners are set at 11.4 and 20 KHz, with a center at 15 KHz (a factor of 10 to 50 above the dither frequency.. A reasonable value for the PRN CLK frequency is then (10)(20)=200 KHz. Sample/hold circuit 46 is designed to sample the noise at both the positive and negative zero crossings of the dither monitor voltage $V_s$. The resulting output is a sequence of steps which have been termed step noise $V_{ns}$. The duration of each step is one-half dither period; the step amplitude is equal to the sampled amplitude and changes in a random fashion. A representative step noise waveform $V_{ns}$ is shown with its corresponding dither rate monitor signal $V_s$ in FIG. 6. In operation, $V_{ns}$ is multiplied by $V_s$ in multiplier 50 of combining circuit 22 in order to generate the desired sinusoidal noise. In the preferred embodiment, the same multiplier 50 is used to control the sinusoidal noise and the steady state dither amplitude. Therefore, the sinusoidal noise drive and the normal drive waveforms are in phase. An alternate embodiment of sample/hold circuit 46 and zero crossing detector 48 is shown generally in FIG. 7. In FIG. 7, the functions of sample/hold circuit 46 and zero crossing detector 48 are merged into a single sampling circuit 140 in which samplers 142 and 144 sample the noise output of bandpass filter 44 on alternate zero crossings of $V_s$. The outputs of samplers 142 and 144 are passed through amplifiers 146 and 148, respectively, to multiplexer 150. Multiplexer 150 then passes the correct sample through based on the current dither half-cycle.

In the embodiment shown in FIG. 2, combining circuit 22 comprises a multiplier 50 connected to an amplifier 52. In one embodiment of such a combining circuit 22, multiplier 50 is a four quadrant multiplier which is used as a loop gain adjusting function to ensure unity gain through the oscillator loop. Amplifier 52 drives the resulting signal to drive electronics 34. In the embodiment shown in FIG. 2, multiplier 50 has a dither disable input for disabling the dither electronics. This is optional.

In the preferred embodiment of the present invention, the spring-mass system is designed with a high mechanical Q (70–200). A high Q spring-mass reduces the driving voltage required while, at the same time, reducing susceptibility to radiation pulses. In a high Q spring-mass system, a high level radiation pulse may momentarily disable the electronics, but the high mechanical Q of the spring-mass system will still maintain dither oscillations for at least 50 milliseconds, much longer than the electronics recovery time. Therefore, the impact on ring laser gyro performance will be negligible.

Figure 8:
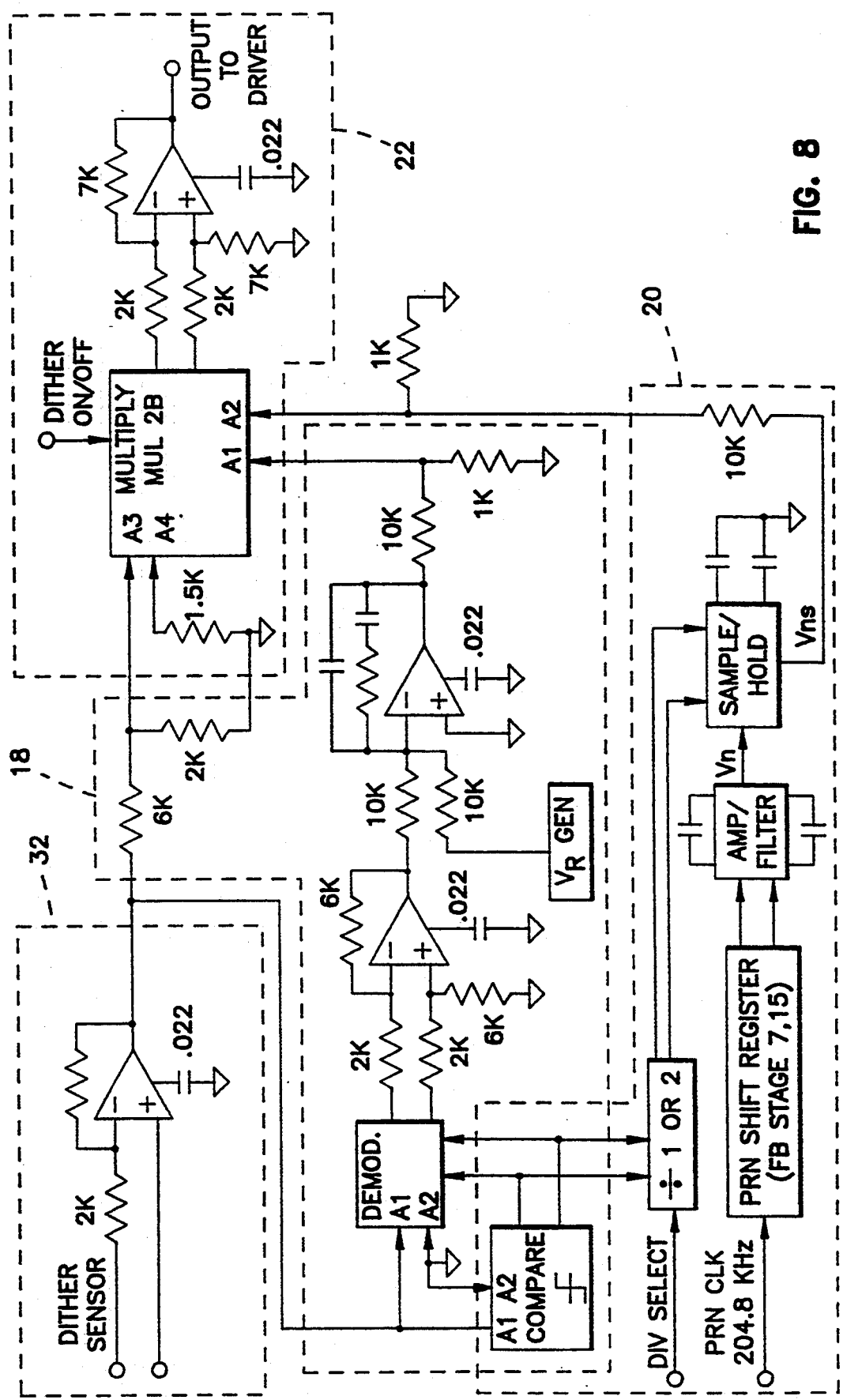
FIG. 8 is a detailed block diagram of an LSI implementation part of the dither electronics of FIG. 1.

An alternate embodiment of amplifier 32, dither amplitude control 18, randomization dither generator 20 and combining circuit 22 is shown generally in FIG. 8. FIG. 8 represents a form of dither mechanism 10 which is suitable for implementation as a large scale integrated circuit. It would be advantageous to use a sampling circuit such as sampling circuit 140 of FIG. 7 in the system of FIG. 8 in order to minimize the space consumed in the integrated circuit.

It is clear that the present method provides a means of controlling dynamic lock-in of ring laser gyroscopic instruments. This application is intended to cover any adaptations or variations of the present invention. Therefore, it is manifestly intended that this invention be limited only by the claims and the equivalents thereof.

What is claimed is:

1. A method of injecting noise into the dither of a ring laser gyroscope having two counter-traveling light beams, comprising the steps of:
   generating a first sinusoidally shaped dither drive signal;
   generating a sinusoidal noise signal having a peak amplitude which shifts as a function of the first dither drive signal to new random peak amplitude levels, wherein the step of generating a sinusoidal noise signal comprises the steps of:
   providing an approximately random noise source;
   selecting designated points of the first dither drive signal to be used as transition points for changing the peak amplitude of the sinusoidal noise signal;
   generating a step noise signal having an amplitude which is constant between the designated points of the first dither drive signal but which can change randomly at the designated points, wherein the step of generating a step noise signal comprises the step of sampling the approximately random noise source at the designated points to form a first sampled noise signal; and
   multiplying the first dither drive signal by the step noise signal;
   summing the first dither drive signal and the sinusoidal noise signal to form a second dither drive signal; and
   frequency biasing one of the light beams with the second dither drive signal.

2. The method according to claim 1 wherein the step of generating a step noise signal further comprises the steps of:
   sampling the first sampled noise signal at the designated points of the first dither drive signal in order to obtain a second sampled noise signal having an amplitude which is constant between the designated points but which changes as a function of the first sampled noise signal at the designated points; and
   subtracting the second sampled noise signal from the first sampled noise signal.

3. The method according to claim 2 wherein the step of selecting designated points of the first dither drive signal comprises the step of selecting positive zero crossings of the first dither drive signal as transition points for changing the peak amplitude of the sinusoidal noise signal.

4. The method according to claim 2 wherein the step of selecting designated points of the first dither drive signal comprises the step of selecting negative zero crossings of the first dither drive signal as transition points for changing the peak amplitude of the sinusoidal noise signal.

5. The method according to claim 2 wherein the step of selecting designated points of the first dither drive signal comprises the step of selecting all zero crossings of the first dither drive signal as transition points for changing the peak amplitude of the sinusoidal noise signal.

6. The method according to claim 2 wherein the step of generating a first sinusoidally shaped dither drive signal comprises monitoring a dither rate corresponding to dither of the ring laser gyroscope.

7. A ring laser gyroscope comprising:
   support means for supporting two counter-traveling beams of substantially monochromatic light substantially travelling in opposite directions in a closed loop path, wherein each of the light beams has a frequency which varies as a function of rotation rate of the closed loop path;

biasing means for causing a frequency bias in a selected one of the light beams, wherein the biasing means comprise dithering means for dithering the selected light beam in order to induce normal frequency bias and randomization frequency bias in the selected light beam;

bias control means, connected to the biasing means, for controlling dither by the dithering means, wherein the bias control means comprise:

dither amplitude sensor means for sensing dither by the dithering means, wherein the dither amplitude sensor means comprise dither monitoring means for obtaining a sinusoidally shaped dither rate monitor signal;

combining means, connected to the biasing means, for generating a composite dither signal from a normal dither and a randomization dither;

dither amplitude control means, connected to the combining means, for controlling the normal dither; and randomization dither generator means, connected to the combining means, for generating the randomization dither as a function of the dither rate monitor signal, wherein the randomization dither generator means comprise:

an approximately random noise source having a noise output signal;

step noise generating means, connected to the approximately random noise source, for generating a step noise signal, wherein the step noise generating means comprise sampling means for sampling the noise output signal at designated points of the dither rate monitor signal; and multiplier means for multiplying the sinusoidally shaped dither rate monitor signal by the step noise signal in order to generate the randomization dither.

8. The apparatus according to claim 7 wherein the dithering means comprise a mechanical dither spring and a dither motor, wherein the mechanical dither spring and dither motor are used to impart a motion to the support means.

9. The apparatus according to claim 7 wherein the approximately random noise source comprises:

random noise generating means for generating an approximately random noise signal; and bandpass filter means for bandpass filtering the approximately random noise signal in order to obtain the noise output signal.

10. The apparatus according to claim 7 wherein the step noise generating means comprise means for detecting positive zero crossings of the dither rate monitor signal and wherein the sampling means comprise means for sampling the noise output signal at the positive zero crossings.

11. The apparatus according to claim 7 wherein the step noise generating means comprise means for detecting negative zero crossings of the dither rate monitor signal and wherein the sampling means comprise means for sampling the noise output signal at the negative zero crossings.

12. The apparatus according to claim 7 wherein the sampling means comprise means for sampling the sampled noise output signal at designated points of the dither rate monitor signal in order to obtain a delayed sampled noise output signal and means for subtracting the delayed sampled noise output signal from the sampled noise output signal.

13. Apparatus for injecting noise into the dither of a ring laser gyroscope, comprising:

an approximately random noise source having a noise output signal;

dither monitoring means for obtaining a sinusoidally shaped dither rate monitor signal;

step noise generating means for generating a step noise signal, wherein the step noise generating means comprise sampling means for sampling the noise output signal at designated points of the dither rate monitor signal; and multiplier means for multiplying the sinusoidally shaped dither rate monitor signal by the step noise signal in order to obtain a sinusoidal noise signal.

14. The apparatus according to claim 13 wherein the approximately random noise source comprises:

random noise generating means for generating an approximately random noise signal; and bandpass filter means for bandpass filtering the approximately random noise signal in order to obtain the noise output signal.

15. The apparatus according to claim 13 wherein the step noise generating means comprise means for detecting positive zero crossings of the dither rate monitor signal and wherein the sampling means comprise means for sampling the noise output signal at the positive zero crossings.

16. The apparatus according to claim 13 wherein the step noise generating means comprise means for detecting negative zero crossings of the dither rate monitor signal and wherein the sampling means comprise means for sampling the noise output signal at the negative zero crossings.

17. The apparatus according to claim 13 wherein the sampling means comprise means for sampling the sampled noise output signal at designated points of the dither rate monitor signal in order to obtain a delayed sampled noise output signal and means for subtracting the delayed sampled noise output signal from the sampled noise output signal.

* * * * *